Figures 1, 2, 3:
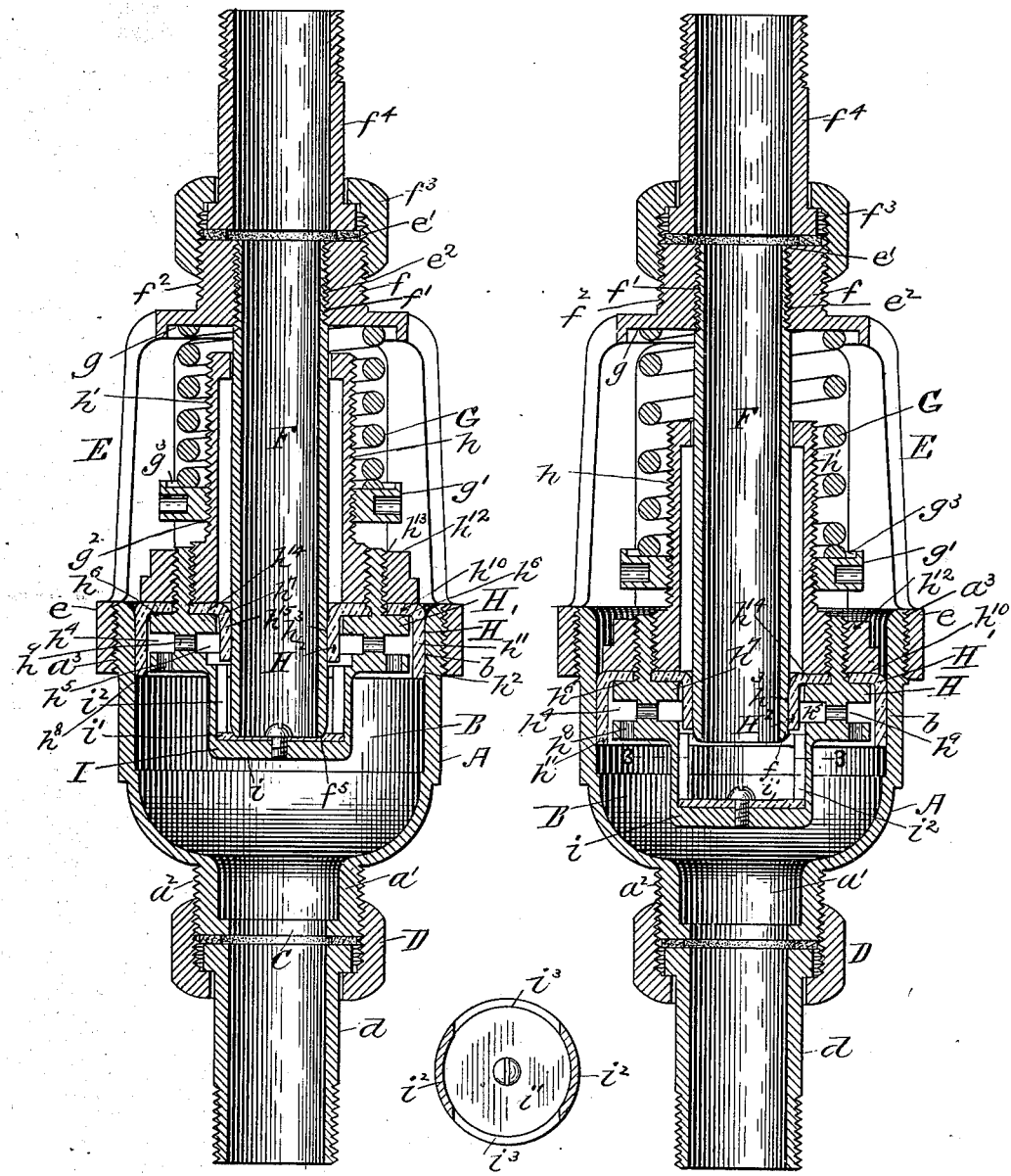

No. 672,787. Patented Apr. 23, 1901.
S. W. LEWIS.
REDUCING VALVE.
(Application filed Oct. 22, 1900.)
(No Model.)

WITNESSES:   INVENTOR:

THE NORRIS PETERS CO., PHOTO-LITHO., WASHINGTON, D. C.

UNITED STATES PATENT OFFICE.

SAMUEL WALKER LEWIS, OF NEW YORK, (BROOKLYN,) NEW YORK, ASSIGNOR TO GEORGE E. GILCHRIST, OF MELROSE, MASSACHUSETTS.

REDUCING-VALVE.

SPECIFICATION forming part of Letters Patent No. 672,787, dated April 23, 1901.

Application filed October 22, 1900. Serial No. 33,940. (No model.)

*To all whom it may concern:*

Be it known that I, SAMUEL WALKER LEWIS, a citizen of the United States, residing at New York, (Brooklyn,) in the county of Kings and State of New York, have invented a new and useful Improvement in Reducing-Valves, of which the following is a full, clear, and exact description, reference being had to the accompanying drawings, forming a part of this specification, in explaining its nature.

The invention relates to that type of device sometimes called a "reducing-valve" and sometimes known as an "automatic pressure-regulator," and is adapted for use in automatically varying pressures on steam, water, gas, or other agent.

The invention is an improvement upon that described in the patent to E. A. McLaughlin, dated May 22, 1888, No. 383,314, and will be described in connection with the drawings, in which—

Figure 1 is a view in longitudinal central section, representing the position of the parts of the valve when closed. Fig. 2 is a view in longitudinal central section, representing the position of the parts of the valve when the valve is open. Fig. 3 is a cross-section upon the dotted line 3 3 of Fig. 2.

Referring to the drawings, A represents a casing which is open at the end $a$ and forms the piston-chamber B. It has the outlet C in the extension $a'$, upon the outer edge of which is a screw-thread $a^2$ for receiving a coupling-nut D, by which a pipe $d$ is fastened to it. It also has on its outer surface, at or near its upper end, the screw-thread $a^3$, upon which screws the threaded cylindrical end $e$ of the open-work or skeleton frame or casing E. This casing serves to rigidly hold the pipe F by means of its outer end $f$, the said outer end having a central hole $e'$, provided with a screw-thread $e^2$, with which the thread $f'$ at the outer end of the pipe F engages. The pipe, however, may be secured to the end $f$ in any other desired way. The said end $f$ of the frame has an exterior screw-thread $f^2$, which receives a coupling-nut $f^3$, by means of which the pipe $f^4$ is attached to the regulator or valve. The frame or casing E also serves to form the seat $g$ for the piston-resistance spring G. The pipe F extends into the cylinder B, is open throughout its length, and its lower end $f^5$ forms a stationary valve-seat. The pipe further serves, in connection with the cylinder-wall, as a guide and support for the piston H, which is movable in the cylinder B. The piston carries the movable valve I, which is represented as located in the cylinder in line with the pipe F and which is movable toward and from the stationary valve-seat $f^5$ at the end of said pipe. It comprises a metal support $i$ of circular shape, upon the inner face of which a compressible packing $i'$ may be mounted. This metal support is attached to the piston by arms $i^2$, which preferably are integral with the support and with a portion of the piston and between which are the passages or waterway $i^3$, through which the liquid or gas flows from the pipe F into the cylinder B when the valve is open. The valve I also forms a portion of the cylinder and receives upon its outer surface pressure of the fluid or gas in the chamber. The cylinder B is sufficiently large to provide outside the pipe F a piston-head to receive the pressure in the cylinder B, of any desired area. The size of the entire piston-head is such that the pressure in the cylinder B when fluid or gas is not passing through it will not only cause the valve I to be closed and held closed against the stationary valve-seat $f^5$, but will also cause the resistance-spring G to be compressed. In other words, in order that the valve may be closed the piston area must be sufficient as compared with the area of the port in the pipe F to enable the pressure in the cylinder B to not only overcome the pressure of the column of water or air in the pipe F, but to also overcome the pressure of the spring G upon the piston. This spring G bears against a movable seat $g'$, attached to the piston sleeve or extension $h$, surrounding the pipe F and forming a long bearing upon the pipe for the piston. A screw-thread $h'$ is formed on the outer edge of this bearing or extension, upon which the spring-seat $g'$ is adapted to be screwed to vary its longitudinal position and to thereby increase or diminish the tension of the spring G upon the piston. The seat as represented is in the form of a disk having the threaded hole $g^2$, the thread of which engages the thread $h'$ of the piston extension, and a sunken recess or channel $g^3$ of a width to receive a portion of the spring. The piston H, it will be seen, has two bearings, the outer one, $h^2$, against the inner surface $b$ of the cylinder and the inner one, $h^3$, against the outer surface of the lower end of the pipe F. It is essential for the safe use of the device that these bearings shall be tight at all times when the valve is in action and when it is not, and I have secured this result by the employment of cup-packings so arranged that while they are maintained in shape by sections of the piston they are also subject to the pressure of the fluid or gas derived from the cylinder, which is caused to exert a continuous and uniform degree of pressure against the inner surfaces of the packings throughout their inner circumferences. This result is obtained by providing the piston H with an outer peripheral channel $h^4$ and a circular inner channel $h^5$, also by providing it with the outer shoulder $h^6$ and the inner shoulder $h^7$. The outer channel $h^4$ is connected with the cylinder by inlet-holes $h^8$, and the outer channel $h^4$ is connected with the inner channel $h^5$ by the inlets $h^9$. The cup-packing H', which packs the joint between the outer surface of the piston and the cylinder, is shaped to provide a flat section $h^{10}$ to rest on the shoulder $h^6$ and with a cylindrical section $h^{11}$ to extend between the edge of the piston and the cylinder and to cover the channel $h^4$. The packing is held to the piston by a clamping-nut $h^{12}$, which screws upon the threaded section $h^{13}$ of the piston and serves to clamp the section $h^{10}$ of the cup-leather against the shoulder $h^6$. The cup-leather $H^2$, which packs the joint between the inner edge of the piston and the wall of the pipe F, has an outer annular flange or section $h^{14}$ and a cylindrical section $h^{15}$. The section $h^{14}$ bears against the shoulder $h^7$ and is clamped thereon by the inner end of the piston extension $h$, which screws into the section $h^{13}$ of the piston, and the cylindrical part $h^{15}$ of the inner cup-packing is contained between the inner edge of the piston and the outer surface of the pipe F, covering the inner channel $h^5$. Pressure contained in the piston channels or chambers $h^4$ $h^5$ will therefore yieldingly act against the cylindrical parts of the cup-packing to force and hold the cup-packing $H^2$ against the wall of the pipe F, and this maintaining pressure upon the packings will be caused and continued so long as there is pressure in the cylinder B, the fluid or gas under pressure communicating freely through the inlets $h^8$ with the chamber or channel $h^4$ and by the inlet $h^9$ with the channel or chamber $h^5$, the cup-packings being protected and held on each side of the pressure zones by continuous sections of the piston.

The employment of cup-packings in a device of this character, as above specified, permits the fitting of the piston to the outer bearing of the pipe F and the cylinder-bearing without any mechanical difficulty or unnecessary machine-work and insures fluid and gas tight joints at all times when under pressure and suitable wearing provision at all times.

The operation of the valve or regulator is substantially like that of other pressure-regulators which are constructed to act upon and be controlled by the variations of piston area, with this exception, that the areas are so adjusted that the pressure in the cylinder will serve to move the piston against the pressure of the resistance-spring, and by varying the tension of this spring the degree of pressure upon what might be termed the "low-pressure" side of the valve may be varied and regulated.

While the piston is represented as sliding upon the stationary inlet-pipe, a hollow bearing inclosing the pipe could be employed.

It will be seen that the piston has three bearings—viz., an inner one furnished by the cup-packing and upon the pipe F, an outer one on the cylinder-wall supplied by the outer cup-packing, and the outer bearing outside of the cylinder and quite removed from it formed by that portion of the end of the sleeve which bears upon the pipe. It will also be seen that the latter bearing is the only metal contact between any part of the piston and the pipe and that it is separated from the inner cup-packing bearing by a relatively long chamber between the two bearings, which also separates the pipe from the sleeve. It will further be seen that each of the cup-packing bearings is formed by a cup-packing, the wall of the cylinder, and a pressure channel or chamber in the wall of the cylinder connected with the cylinder and receiving pressure therefrom which acts upon the side of the cup-packing to force it against its bearing, the piston-wall supporting the cup-packing upon each side of this pressure channel or recess and so that the lower or free end of each cup-packing is held in place or to its bearing by the piston-wall, and thus cannot by shrinkage or any other means become inoperative. I would further call attention to the fact that the spring employed is not used for the purpose of closing the valve, but acts in opposition to its closing movement. It will be noted, further, that the metallic or outer bearing is narrow and being quite removed from the inner or non-metallic bearings permits the said inner or non-metallic bearings to automatically adjust themselves to the wall of the pipe which furnishes the central bearing of the piston and the wall of the cylinder as well under all conditions of use.

Having thus fully described my invention, I claim and desire to secure by Letters Patent of the United States—

1. The combination in a pressure-regulator of the cylinder, an inlet and outlet therefrom, a stationary valve-seat about the inlet, a piston in the cylinder having an annular channel or recess in its edge which is connected to the cylinder to receive pressure therefrom, and a cup-packing attached to the piston to be carried by it and have a section between its edge and the wall of the cylinder which covers the annular recess or channel in the piston and is supported upon its inner surface by the wall of the piston upon each side of the recess or channel, and a valve to close against the stationary valve-seat connected with the piston to be moved thereby.

2. The combination in a pressure-regulator of the cylinder, an inlet thereto, an outlet therefrom, a stationary valve-seat about the inlet, a piston in the cylinder-chamber, a valve to close against the stationary valve-seat connected with the piston to be moved thereby, a cup-packing carried by the piston having a section between it and the wall of the cylinder, a second cup-packing carried by the piston having a section upon the inner edge of the piston between it and the bearing-wall, the piston having a channel or recess in its outer edge and one in its inner edge covered respectively by the outer and inner cup-packings, which recesses or channels are connected with the cylinder-chamber and receive pressure therefrom.

3. The combination in a pressure-regulator of a cylinder, a stationary pipe extending into the cylinder providing an inlet-passage, a stationary valve-seat and an inner bearing for the piston, a piston in the cylinder mounted upon said pipe and packings interposed between said piston, said stationary pipe and the cylinder-wall, the surfaces of which furnish the only contacts of the piston with the pipe and with the wall, and a bearing-sleeve attached to the piston, surrounding said pipe and having a narrow bearing upon said pipe at its outer end only, and a valve carried by said piston to close against the stationary valve-seat.

4. The combination in a pressure-regulator of a cylinder, a stationary pipe extending into the cylinder providing an inlet-passage thereto, a stationary valve-seat therein and an inner bearing upon which the piston moves, a piston mounted in the cylinder and upon said pipe having a steadying-sleeve surrounding the pipe and having a narrow outer bearing thereon considerably removed from the main piston-bearing, packings interposed between the piston and the cylinder and the piston and the stationary pipe, a valve carried by said piston to close against the stationary valve-seat, and a spring to bear against the piston with the main water-pressure and to be compressed by the movement of the piston upon the closing of the valve.

5. The combination in a pressure-regulator of a cylinder, a stationary, hollow piston-bearing extending into the cylinder providing an inlet-passage and a stationary valve-seat, a piston mounted in said cylinder upon said bearing, packings interposed between the piston and the cylinder and said hollow bearing, recesses or channels in the piston covered by or back of said packings, which channels or recesses are connected with the cylinder to receive pressure therefrom and are arranged to direct it upon the packings to force and maintain them against the bearings and a spring to bear against the piston in opposition to the pressure of the cylinder and means for adjusting the tension of the spring.

6. The combination in a pressure-regulator of a cylinder, a central, stationary, hollow bearing providing an inlet to the cylinder and a stationary valve-seat, an annular piston contained in the piston-chamber having the recesses or channels $h^4$, $h^5$, shoulders $h^6$, $h^7$, an annular extension $h^{13}$ having an interior and exterior screw-thread, packings H', $H^2$, sections of which rest on the shoulders $h^6$, $h^7$ and sections of which cover the channels or recesses $h^4$, $h^5$, nuts screwing on the threaded extension to clamp the sections of the packings against the shoulders, as and for the purposes described.

7. The combination in a pressure-regulator of the casing A forming a piston-chamber, its outlet, the said casing having a screw-thread about its outlet and also about the end opposite the outlet, a cage having at one end an annular threaded ring to screw upon the cylinder-casing and at the other end an annular ring threaded upon its exterior to receive a pipe-coupling and upon its interior to hold a pipe or bearing, the said pipe or bearing extending into the cylinder and having a valve-seat at its lower end, a piston having an inner and outer channel in its sides as described, connected with the cylinder, piston-packings secured to the piston by nuts and having sections extending over said channels or recesses, one of said nuts having an elongated extension upon the pipe and acting as a bearing and being provided with an exterior thread, a threaded spring-holder adjustable on said threaded extension, a pressure-spring to bear upon said holder and the case and a valve to close against the stationary seat attached to the piston to be movable therewith.

8. In a pressure-regulator, the combination of a cylinder having an inlet thereto, an outlet therefrom and a stationary valve-seat, a piston in the cylinder having a central hole and an annular channel or recess extending inward from the wall of said hole and an annular channel or recess extending inward from its outer wall, cup-packings attached to the piston, one of which extends over its inner wall and covers the recess or channel therein and the outer face of which is supported upon both sides thereof by the wall of the piston and which furnishes the inner bearing for the piston, and the other of which cup-packings is upon the outer wall of said piston and extends across the recess or channel therein and is supported upon both sides thereof by the said outer wall, furnishing an outer bearing for the piston, the said piston recesses or channels being connected with the cylinder to receive pressure therefrom, a valve to close against the stationary valve-seat connected with the piston, and a spring to act in opposition to the closing movement of the valve.

9. The combination in a pressure-regulator of a cylinder having an inlet, an outlet and a valve-seat, a piston in the cylinder having a valve to close against the valve-seat and provided with three bearings, one furnished only by a cup-packing against the wall of a cylinder, one furnished only by a cup-packing against a central stem, the two cup-packings being in line with each other and a narrow exterior metallic bearing upon the stem considerably removed from the packing-bearing and separated from it by a chamber.

SAML. WALKER LEWIS.

Witnesses:
F. F. RAYMOND, 2d,
J. M. DOLAN.